US012702626B2

(12) United States Patent
Cudworth

(10) Patent No.: US 12,702,626 B2
(45) Date of Patent: Aug. 11, 2026

(54) VENTING MEMBER, FEEDING BOTTLE ASSEMBLY, AND METHOD OF FORMING A VENTING MEMBER

(71) Applicant: Mayborn (UK) Limited, Newcastle Upon Tyne (GB)

(72) Inventor: Nicholas Cudworth, Newcastle Upon Tyne (GB)

(73) Assignee: Mayborn (UK) Limited, Newcastle Upon Tyne (GB)

(*) Notice: Subject to any disclaimer, the term of this patent is extended or adjusted under 35 U.S.C. 154(b) by 0 days.

(21) Appl. No.: 18/850,264

(22) PCT Filed: Mar. 24, 2023

(86) PCT No.: PCT/GB2023/050763
§ 371 (c)(1),
(2) Date: Sep. 24, 2024

(87) PCT Pub. No.: WO2023/180770
PCT Pub. Date: Sep. 28, 2023

(65) Prior Publication Data
US 2025/0213432 A1 Jul. 3, 2025

(30) Foreign Application Priority Data
Mar. 24, 2022 (GB) ...................................... 2204192
Feb. 10, 2023 (GB) ...................................... 2301913

(51) Int. Cl.
*A61J 9/04* (2006.01)
*A61J 11/02* (2006.01)

(52) U.S. Cl.
CPC *A61J 9/04* (2013.01); *A61J 11/02* (2013.01)

(58) Field of Classification Search
CPC ........ B65D 47/32; B65D 51/2807; A61J 9/04; A61J 11/02; A61J 9/001; A61J 11/04;
(Continued)

(56) References Cited

U.S. PATENT DOCUMENTS 3,044,650 A * 7/1962 Oltion .................... A61J 11/002 215/11.1
3,547,296 A * 12/1970 Greenberg ........... A61J 11/0005 215/11.4
(Continued)

FOREIGN PATENT DOCUMENTS

CA 2714171 A1 8/2009
CN 201888942 U 7/2011
(Continued)

OTHER PUBLICATIONS

International Preliminary Report on Patentability in International Appln. No. PCT/GB2023/050763, mailed on Oct. 3, 2024, 8 pages.
(Continued)

*Primary Examiner* — Ernesto A Grano
(74) *Attorney, Agent, or Firm* — Fish & Richardson P.C.

(57) ABSTRACT

The present invention relates to a venting member, particularly a venting member for an infant feeding bottle assembly. A feeding bottle assembly itself, and a method of forming a venting member are also disclosed. The venting member vents air into an infant feeding bottle assembly and includes: a first member portion having a tube portion with a first opening and a second opening; a second member portion connected to, and configured to be mountable on, the first member portion so that the second opening of the first member portion is selectively closed by the second member portion; and an inlet for venting air into the venting member, wherein the venting member is configured so that the inlet is fluidly connected to the first opening of the first member portion when the second member portion is mounted on the first member portion. The venting member is configured to be mounted, in use, to a container of an infant feeding bottle assembly so that the first opening is disposed within the
(Continued)

container. The first member portion and second portion are integrally formed by injection moulding.

12 Claims, 6 Drawing Sheets

(58) Field of Classification Search
CPC ........ A61J 11/0015; A61J 9/005; A61J 9/006; A61J 11/00; A47G 19/2266; A47G 19/2272
USPC ....................................................... 215/6, 11.5
See application file for complete search history.

(56) References Cited

U.S. PATENT DOCUMENTS

| | | | | |
|---|---|---|---|---|
| 3,946,888 | A | 3/1976 | Tonkin | |
| 4,273,272 | A * | 6/1981 | Blanc | B05B 11/0059 222/464.4 |
| 4,898,290 | A * | 2/1990 | Cueto | A61J 9/006 215/11.1 |
| 4,940,152 | A * | 7/1990 | Lin | A61J 9/00 215/11.1 |
| 4,993,568 | A * | 2/1991 | Morifuji | A61J 11/002 215/11.4 |
| 5,105,956 | A * | 4/1992 | Tarng-Lin | A61J 9/00 215/11.1 |
| 5,211,298 | A * | 5/1993 | Bloch | A47G 19/2266 215/11.1 |
| 5,862,927 | A * | 1/1999 | Tebeau | A61J 9/006 248/104 |
| 5,873,474 | A * | 2/1999 | Gray | A61J 9/006 215/11.4 |
| 5,938,053 | A * | 8/1999 | Verbovszky | A47G 19/2272 215/11.4 |
| 6,041,951 | A * | 3/2000 | Blum | A61J 9/006 215/11.1 |
| 6,068,147 | A * | 5/2000 | Sheu | A61J 9/006 215/11.1 |
| 7,044,316 | B1 * | 5/2006 | Hsu | A61J 11/0005 215/11.1 |
| 7,798,347 | B2 * | 9/2010 | Rees | A61J 9/04 220/360 |
| 7,959,021 | B2 * | 6/2011 | Liang | A61J 9/04 215/11.1 |
| 8,684,201 | B2 * | 4/2014 | Berkovitch | A61J 9/04 215/11.4 |
| 9,566,214 | B2 * | 2/2017 | Eitrheim | A61J 9/00 |
| 10,195,117 | B2 | 2/2019 | Britto | |
| 10,206,855 | B2 * | 2/2019 | Reed | A61J 9/006 |
| 10,919,676 | B2 | 2/2021 | Smitshoek | |
| 11,596,580 | B2 * | 3/2023 | Sun | A61J 9/04 |
| 2001/0027956 | A1 * | 10/2001 | Bonacorso | A61J 9/00 215/396 |
| 2004/0060888 | A1 * | 4/2004 | Ahn | F16K 15/08 215/11.1 |
| 2004/0188372 | A1 * | 9/2004 | Ruth | A61J 11/0005 215/11.4 |
| 2006/0237387 | A1 | 10/2006 | Pyun | |
| 2008/0099422 | A1 | 5/2008 | Rees | |
| 2009/0014403 | A1 * | 1/2009 | Lu | A61J 9/04 215/11.5 |
| 2009/0071926 | A1 | 3/2009 | Berkovitch et al. | |
| 2010/0181277 | A1 * | 7/2010 | Brown | A61J 9/04 215/11.5 |
| 2011/0309047 | A1 * | 12/2011 | Fucito | A61J 9/04 215/11.5 |
| 2014/0163463 | A1 * | 6/2014 | Agbo | A61J 7/0046 215/396 |
| 2016/0067146 | A1 * | 3/2016 | Zhou | A61J 11/0085 215/11.5 |
| 2018/0104155 | A1 | 4/2018 | Reed | |
| 2018/0168936 | A1 * | 6/2018 | Stanislawczyk | A61J 11/002 |
| 2019/0144173 | A1 * | 5/2019 | Fu | B65D 43/0225 222/1 |
| 2019/0167530 | A1 * | 6/2019 | Britto | A61J 11/02 |
| 2019/0183740 | A1 * | 6/2019 | Yang | B01F 21/10 |
| 2019/0269577 | A1 * | 9/2019 | Reed | A61J 11/02 |
| 2019/0380915 | A1 | 12/2019 | Shastri et al. | |

FOREIGN PATENT DOCUMENTS

| | | | |
|---|---|---|---|
| CN | 202666015 | U | 1/2013 |
| CN | 203263836 | U | 11/2013 |
| CN | 207950195 | U | 10/2018 |
| CN | 211096152 | U | 7/2020 |
| EP | 1732820 | B1 | 3/2005 |
| EP | 1809548 | B1 | 4/2017 |
| WO | WO 2006/038216 | A2 | 4/2006 |

OTHER PUBLICATIONS

International Search Report and Written Opinion in International Appln. No. PCT/GB2023/050763, mailed on Jun. 16, 2023, 11 pages.
Office Action in British Appln. No. 2412396.0, mailed on Oct. 9, 2024, 2 pages.
Office Action in British Appln. No. 2508860.0, mailed on Jun. 16, 2025, 1 page.
Office Action in British Appln. No. 2204192.5, mailed on Aug. 23, 2022, 1 page.
Office Action in British Appln. No. 2301913.6, mailed on Jul. 21, 2023, 1 page.

* cited by examiner

VENTING MEMBER, FEEDING BOTTLE ASSEMBLY, AND METHOD OF FORMING A VENTING MEMBER

CROSS-REFERENCE TO RELATED APPLICATIONS

This application is a national stage application under 35 U.S.C. § 371 of PCT International Application No. PCT/GB2023/050763, filed Mar. 24, 2023, which claims the priority of Great Britain patent application number 2301913.6, filed with the UK Intellectual Property Office on Feb. 10, 2023 and Great Britain patent application number 2204192.5, filed with the UK Intellectual Property Office on Mar. 24, 2022. The entirety of the prior applications are incorporated herein by reference.

The present invention relates to a venting member, particularly a venting member for an infant feeding bottle assembly. A feeding bottle assembly itself, and a method of forming a venting member are also disclosed.

INTRODUCTION

Conventional infant feeding bottle assemblies include a container and a teat held on the container by a screw-on collar or screw ring. A problem with conventional feeding bottles is that as an infant sucks on the teat a negative pressure builds up within the container as a result of which it becomes progressively more difficult to feed which can give rise to problems such as colic.

As is commonly understood in relation to infant feeding bottle assemblies, an apparatus for venting air is an apparatus to direct, control or convey air from the atmosphere into the assembly or into a component thereof. Known infant feeding bottle assemblies attempt to alleviate negative pressure by providing a range of venting systems to vent air into the infant feeding bottle assembly. As used herein, an apparatus for venting air into an infant feeding bottle assembly is an apparatus to direct, control or convey air from the atmosphere surrounding the assembly into the infant feeding bottle assembly to alleviate a negative pressure. An apparatus for venting air into an infant feeding bottle assembly may be known as a venting member.

In certain known arrangements, a venting member includes an air conduit communicating with the atmosphere through an inlet. Typically, the air conduit is formed within an insert, or body, of the venting member which is mounted to the mouth of the container of the infant feeding bottle assembly. The venting member is secured on the container using a screw ring.

A further conduit, for example a tube or tube portion, projects down from the air conduit to a point close to the bottom of the container. In the upright position the container is filled with liquid for feeding an infant. When the infant is feeding the container is inverted so that an end of the tube portion projects above the level of the liquid. An air passage is thereby provided from the atmosphere through the tube and air conduit to the bottle such that pressure equalisation is provided when the infant drinks.

Certain venting systems of the prior art additionally include an air valve so as to control air passage through the venting member, or to provide a one-way ingress of air into the container without fluid in the container leaking back into the venting member.

Known venting members thereby include several components. The components of know systems are formed of plastic and/or elastomer materials and are manufactured using well known moulding techniques. Typically, venting members and their components are formed by injection moulding.

One of the drawbacks of the solutions according to the prior art is that they require a complex arrangement of component parts because aspects of the parts, such air conduits and tubes, require accurate positioning and connection. Such parts are more difficult and expensive to manufacture using known forming techniques, such as injection moulding. Complex arrangements of component parts are necessarily manufactured as simple, separate parts which also multiplies the manufacturing processing time and increases costs.

Separate parts can also become lost which makes the system unusable.

A further drawback is that venting members are difficult to clean. In particular, certain known examples include spaces or voids that are difficult to access with cleaning implements. Such spaces or voids are hidden from the user. For these reasons, dirt may accumulate causing a hygiene hazard.

Accordingly, it would be useful to provide a venting member with fewer component parts. It would also be useful to provide a venting member which is easier to assembly or which can be easily mounted within an infant feeding bottle assembly. Stated differently, it would be useful to provide a simplified venting member.

It would also be useful to provide a venting member which allows for easy cleaning. In particular, it would be useful if the internal spaces or voids of a venting member were visible and accessible for cleaning by the user.

It would also be useful to provide a venting member which is compatible with a range of nipples as may be used in an infant feeding bottle assembly. That is, it would useful if the venting member is compatible with an assembly regardless of the configuration of the nipple, or the features thereon.

SUMMARY OF THE INVENTION

The invention is set out in the appended claims.

According to an aspect of the invention, there is provided a venting member for venting air into an infant feeding bottle assembly, the venting member including a body configured to mount the venting member, in use, to a container of an infant feeding bottle assembly, the body including an inlet configured to vent air into the venting member;

and a tube portion having a first opening, wherein the tube portion is fluidly connected to the inlet and configured such that, in use, the first opening is disposed within the container.

According to another aspect of the invention, there is provided a venting member for venting air into an infant feeding bottle assembly, the venting member including:

a first member portion having a tube portion with a first opening and a second opening;

a second member portion connected to, and configured to be mountable on, the first member portion so that the second opening of the first member portion is selectively closed by the second member portion; and an inlet for venting air into the venting member, wherein the venting member is configured so that the inlet is fluidly connected to the first opening of the first member portion when the second member portion is mounted on the first member portion;

wherein the venting member is configured to be mounted, in use, to a container of an infant feeding bottle assembly so that the first opening is disposed within the container; and wherein the first member portion and second portion are integrally formed by injection moulding.

By providing a first member portion and a second member portion with the features set out above, integrally formed by injection moulding, the respective member portions may be configured to provide effective venting in a second, closed or mounted, position. The device also provides easy cleaning in a first, open or demounted, position because the inner cavities and surfaces of the device are made accessible. In particular, the venting member may be easily manufactured while providing relative movement between the member portions so as to provided simple movement between the first and second positions.

Aptly, the first member portion includes a body configured to mount the venting member, in use, to the container of an infant feeding bottle assembly; and wherein the tube portion extends through the body.

Aptly, the second member portion is a cover configured to selectively close the second opening when mounted to the first member portion.

Aptly, the second member portion includes a body configured to mount the venting member, in use, to the container of an infant feeding bottle assembly.

Aptly, when the second member portion is mounted on the first member portion, the tube portion extends along a central axis of the body and is fluidly connected to the inlet by a conduit extending radially from the tube portion; and wherein the conduit extends away from the tube portion at angle in the range of from greater than 90° to 150° with respect to the central axis According to another aspect of the invention, a venting member is provided for venting air into an infant feeding bottle assembly, the venting member including:

a body configured to mount the venting member, in use, to a container of an infant feeding bottle assembly, the body including an inlet configured to vent air into the venting member;

and a tube portion having a first opening and extending into the body along a central axis of the body, wherein the tube portion is fluidly connected to the inlet by a conduit extending radially from the tube portion, and the tube portion is configured such that, in use, the first opening is disposed within the container;

and wherein the conduit extends away from the first opening of the tube portion at angle in the range of from greater than 90° to 150° with respect to the central axis.

Aptly, the conduit extends away from the first opening of the tube portion at angle in the range of from 110° to 135° with respect to the central axis. More aptly, the conduit extends away from the first opening of the tube portion at angle in the range of from 120° to 135° with respect to the central axis.

By providing a conduit extending away from the first opening at an angle greater than 90°, when the venting member is mounted in an infant feeding bottle assembly, the nipple volume is maximised. Advantageously, the possibility of the venting member impeding the nipple, including a nipple flange or a nipple one-way valve, is reduced because the venting member provides a recessed surface to better accommodate the nipple. Thus, a smoother flow of liquid may be achieved from the nipple to the feeding infant.

According to another aspect of the invention, there is provided a venting member for venting air into an infant feeding bottle assembly, the venting member including:

a body configured to mount the venting member, in use, to a container of an infant feeding bottle assembly, the body including an inlet configured to vent air into the venting member;

and a tube portion having a first opening and a second opening, and extending through the body, wherein the tube portion is fluidly connected to the inlet and configured such that, in use, the first opening is disposed within the container; and wherein the second opening is selectively closable.

By providing a venting member in which the tube portion is fluidly connected to the inlet then, in use, the first opening of the tube portion will be disposed within container. The arrangement enables air from the inlet to be vented into the venting member, and thereby, the container. In particular, the air vented into the venting member is vented into the container through the first opening.

Aptly, the tube portion may be integrally formed with the body.

Aptly, the tube portion may extend distally from the body so that, in use, the first opening is disposed proximal to the base of the container. In this way, the container is inverted by the feeding infant, the first opening projects above the level of the liquid.

Aptly, the tube portion may include a one-way valve mounted to the first opening and configured to control venting of air into the container. In this way, the one-way valve may be configured to control the air venting of air into the container through the first opening.

Aptly, the one-way valve may be provided on a valve member configured to be selectively mounted to the first opening.

Aptly, the one-way valve may be configured to be mounted to the first opening.

Aptly, the one-way valve may be configured to be provided on a valve member so as to be selectively demounted from the first opening.

Aptly, the one-way valve may be integrally formed with the tube portion.

Aptly, the one-way valve referred to herein, may be a duckbill valve, a slit valve or a dome valve. The slit valve or dome valve may include a single slit or a cross-cut slit.

Aptly, the one-way valve may be formed of an elastomer. Preferably, the elastomer has a hardness of 30 Shore A, 40 Shore A, 50 Shore A, 60 Shore A or 70 Shore A, and more preferably a hardness of 30 or 40 Shore A. In the alternative, the elastomer preferably has a hardness in the range of from 30 to 70 Shore A, and more preferably a hardness in the range of from 30 to 40 Shore A. Preferably, the elastomer is a silicone rubber or a thermoplastic elastomer.

Aptly, the tube portion may extend along an axis. The tube portion may extend through or along an axis in parallel to, or at an angle to, an axis of the body. In particular, the axis of the body may be a central axis, of the body.

Aptly, the tube portion may extend in a linear, curved, helical or irregular path.

Aptly, the first and second openings may be provided on the axis.

Aptly the tube portion may be tapered. In this way, the outer wall of the tube portion narrows as it extends from the body. The tube portion may narrow towards the first opening.

Aptly, the tube portion may narrow to a waist at a position along the tube portion, but distal from the first opening. In this way, the tube portion may include an upper section, extending to the waist, in which the tube portion has a first taper angle.

Aptly, the tube portion may include a lower section, extending from the waist towards the first opening. The lower section may then have a second taper angle. Thus, as the tube portion extends from the waist towards the first opening, the tube portion may have a constant diameter, may flair outwards, or may narrow at a different taper angle to the first taper angle. The lower section may have a constant diameter, may flair outwards, or may narrow at a different taper angle to the first taper angle.

Aptly, a cross-sectional area of the tube portion at the second opening may be greater than a cross-sectional area of the tube portion at the first opening. That is, the tube portion may encompass a conduit or volume, and the cross-sectional area may be determined at any point along the tube portion. The conduit or volume encompassed by the tube portion may be defined by the wall of the tube portion.

Aptly, the venting member may include a cover, wherein the cover is configured to selectively close the second opening.

Aptly, the cover may be integrally formed with the venting member. Aptly, the cover may be integrally formed with the body or a part thereof.

Aptly, the cover includes a handle portion.

Aptly, the cover is formed at an angle to extend away from a venting member central axis. The venting member central axis is the vertical axis of the venting member in use. Stated differently, in the first position, the cover is disposed so that the cover central axis is at angle of greater than 90° to the central axis of the venting member. That is, the cover includes first cover portion at the edge adjoined to the hinge, and a second cover portion provided at the edge opposing the hinge. In the first position, the first cover portion is disposed closer to the venting member central axis that the second cover portion. In this way, the cover may be formed, for example by injection moulding, with greater ease of manufacturing. Furthermore, the hinge of the cover may be more robust and resistant to wear from flexing between first and second positions.

Aptly, the venting member may include a sealing means configured to provide a sealing engagement between the cover and the second opening when the cover closes the second opening. More aptly, the sealing means may be an interference fit, that is an interference fit between the cover and the second opening. More aptly, the sealing means may include a resiliently deformable portion.

Aptly, the body may be annular, and the tube portion may be configured to extend axially to the body.

Aptly, the tube portion may be provided to extend through a hub portion of the body.

Aptly, the body may include a perimeter portion and the inlet is provided in the perimeter portion. More aptly, the body may include a perimeter portion and a tube portion fluidly connected to the inlet of the perimeter portion without the use of a hub portion.

Aptly the body may further include at least one radial member extending between the perimeter portion and the hub portion. More aptly, the tube member may be fluidly connected to the inlet via a conduit through at least one radial member. The tube portion may be fluidly connected to the inlet through a radial member without the use of a hub portion.

Aptly, the body or the tube portion may be formed of a thermoplastic or an elastomer. More aptly, the body or the tube portion may be formed of a mixture of one or more thermoplastic and/or one or more elastomer. Aptly, the body or the tube portion may be formed with a hardness of 60 Shore A, 70 Shore A, 80 Shore A or 90 Shore A, and preferably a hardness of 70 or 80 Shore A. Aptly, the body or the tube portion may be formed with a hardness in the range of from 60 to 90 Shore A, and preferably a hardness in the range of from 70 to 80 Shore A. Aptly, the thermoplastic may be polypropylene or polyethylene. Aptly, the elastomer may be a silicone rubber or a thermoplastic elastomer. More aptly, the body and the tube portion may be formed of a common material, or may be formed of different materials.

Aptly, the venting member may include first and second opposing surfaces. In this way, the venting member may be configured to be mounted, in use, to a container of an infant feeding bottle assembly so that the first surface is disposed towards the container and the second surface is disposed towards a nipple of an infant feeding bottle assembly.

According to a further aspect of the invention, there is provided an infant feeding bottle assembly including a container and a venting member including:

- a body configured to mount the venting member, in use, to the container, the body including an inlet configured to vent air into the venting member;
- and a tube portion having a first opening and a second opening, and extending through the body,
- wherein the tube portion is fluidly connected to the inlet and configured such that, in use, the first opening is disposed within the container;
- wherein the second opening is selectively closable; and
- wherein the venting member is mounted to the container so as to vent air into the infant feeding bottle assembly.

According to a further aspect of the invention, there is provided a method of forming a venting member for venting air into an infant feeding bottle assembly, the method including:

- forming a first member portion having a tube portion with a first opening and an second opening;
- forming a second member portion connected to, and configured to be mountable on, the first member portion so that the second opening of the first member portion is selectively closed by the second member portion; and
- forming an inlet for venting air into the venting member, wherein the venting member is configured so that the inlet is fluidly connected to the first opening of the first member portion when the second member portion is mounted on the first member portion;
- wherein the venting member is configured to be mounted, in use, to a container of an infant feeding bottle assembly so that the first opening is disposed within the container; and
- wherein the first member portion and second portion are integrally formed by injection moulding.

According to a further aspect of the invention, there is provided method of forming a venting member for venting air into an infant feeding bottle assembly, the method including:

- forming a body configured to mount the venting member, in use, to a container of an infant feeding bottle assembly, wherein the body includes an inlet configured to vent air into the vent assembly;
- forming a tube portion having a first opening and a second opening, extending through the venting member, wherein the tube portion is fluidly connected to the inlet and configured such that, in use, the first opening is disposed within the container, and wherein the second opening is selectively closable.

Aptly, the body may be formed integrally with the tube portion.

Aptly, the method may further include the step of forming a cover, wherein the cover is configured to be mountable to the venting member to selectively close the second opening.

Aptly, the venting member may include a sealing means configured to provide a sealing engagement between the cover and the second opening when the cover closes the second opening.

Aptly, the method may further include the step of forming a one-way valve, mounted to the first opening. Aptly, the method may further include the step of forming a valve member with a one-way valve thereon, wherein the valve member is configured to be selectively mounted to the first opening.

Aptly, the method may further include forming a one-way valve with the vent assembly, wherein the one-way valve and, optionally, the valve member, is formed integrally with the tube portion.

Certain examples provide an advantage of a venting member for an infant feeding bottle assembly with a reduced number of parts. In particular, the components and their respective configuration are sufficiently simplified so that the venting member may be formed as a single part. For example, the body may be integrally formed with one or more of the cover, the tube portion or the valve member. In this way the venting member may be less expensive to manufacture and may also be easier for a user to assemble and disassemble. In particular, by integrally forming the first member portion and second member portion using injection moulding, the respective portions may be configured to provide effective venting in a second position, that is a closed, or mounted position. The configuration also provides easy cleaning in a first positions, that is an open, or demounted position.

Certain examples ensure parts of the venting member do not become separated from each other, thereby reducing the risk of losing a part.

Certain examples ensure the venting member is easier for the user to clean, even if respective parts are integrally formed. In particular, by providing access to the internal space or void of the venting member, for example by the selectively closable second opening, the body and tube portion are easily cleaned. In this way, the venting member ensures better hygiene as all internal surfaces can be checked for and cleaned of residual dirt.

Certain examples are easy to manufacture, even if respective parts are integrally formed. In particular, the examples may be easily manufactured while providing relative movement between the member portions. That is, to provide member portions that may be moved so that, in a second position, the member portions are readily compatible with an infant feeding bottle assembly to vent air therein. Then, in a first position, the member portions are easy to clean.

BRIEF DESCRIPTION OF THE DRAWINGS

Embodiments of the invention are now described, by way of example only, hereinafter with reference to the accompanying drawings, in which.

In the drawings, like reference numerals refer to like parts.

DETAILED DESCRIPTION

Figure 1:
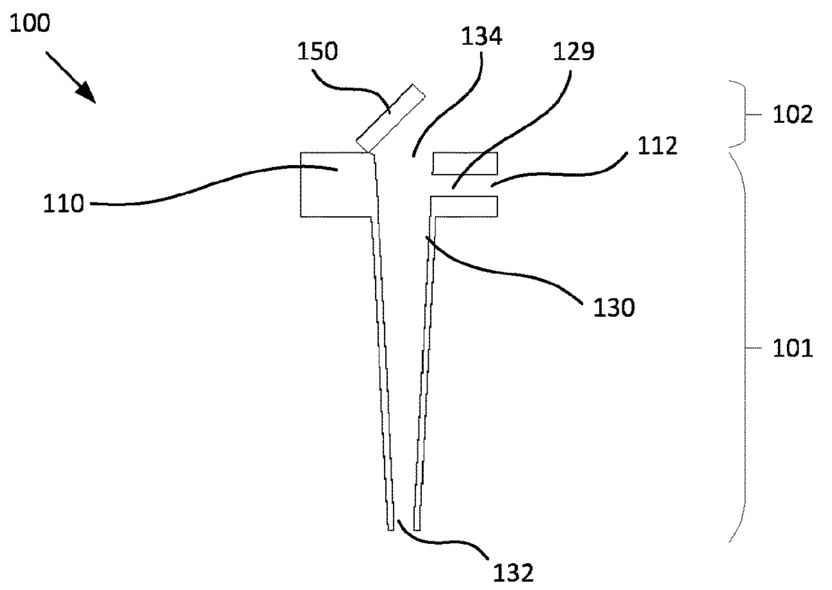
FIG. 1 shows a side cross-sectional view of an example venting member.

Certain terminology is used in the following description for convenience only and is not limiting. The words 'lower', 'upper', 'down' and 'downward' designate directions in the drawings to which reference is made and are with respect to the described component when assembled and mounted. The words 'inner', 'inward', 'outer', and 'outwardly' refer to directions toward and away from, respectively, a designated centreline or a geometric centre of an element being described (e.g. central axis), the particular meaning being readily apparent from the context of the description.

Further, as used herein, the terms 'connected' and 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, 'first', 'second', 'third' etc. merely indicate that different instances of like objects are being referred to and are not intended to imply that the objects so described must be in a given sequence, either temporally, spatially, in ranking or in any other manner.

Referring now to FIG. 1, there is shown a schematic cross section view of a venting member 100 for venting air into an infant feeding bottle assembly. The venting member 100 includes a first member portion 101 having a tube portion 130 with a first opening 132 and a second opening 134.

The venting member 100 includes a second member portion 102 connected to, and configured to be mountable on, the first member portion 101 so that the second opening 134 is selectively closed by the second member portion 102.

In the example shown, the second member portion 102 is a cover 150. The cover 150 is configured to selectively close the second opening 134 when mounted to the first member portion 101. The second opening 134 is selectively closable. The second opening 134 is selectively closed by mounting the cover 150 to the first member portion 101.

The venting member 101 also includes an inlet 112 for venting air from the atmosphere into the venting member 100, wherein the venting member 100 is configured so that the inlet 112 is fluidly connected to the first opening 132 of the first member portion 101 when the second member portion 102 is mounted on the first member portion 101.

The venting member 101 is configured to be mounted, in use, to a container of an infant feeding bottle assembly so that the first opening 132 is disposed within the container.

In the example shown in FIG. 1, the first member portion 101 includes a body 110 configured to mount the venting member 100 in use to a container of an infant feeding bottle assembly. The body 110 includes the inlet 112 and a tube portion 130. The tube portion 130 is arranged to extend through the body 110. In this way, the tube portion 130 is configured to be fluidly connected to the inlet 112 of the first member portion 101 and such that, in use, the first opening 132 is disposed within the container.

The body 110 includes a perimeter portion and a hub portion. The perimeter portion extends around the hub portion. In this way, the body 110 is an annular body with the perimeter portion forming an outer circumference and the hub portion arranged axially to the perimeter portion.

The body 110 is configured to be mounted to the mouth of a container. The body 110 is annular and is sized to be mounted to the mouth so that the body sits outside the container. In example shown, the body has a diameter of 56 mm. However, the body may be adapted to be mounted to the mouth of other containers of infant feeding bottle assemblies, for example by adapting the size of the body, without significantly affecting the venting function of the inlet and tube portion, The body 110 is configured to be mounted to a container so that the tube portion 130 extends into the container. In this way, when mounted in the container of an infant feeding bottle assembly the tube portion 130 extends towards the base of the container. Consequently, in use within an assembly, the first opening 132 is disposed proximal the base of the container. Thus, when the infant feeding bottle assembly is used for feeding the first opening 132 may be disposed in a space above the liquid held by the container so that air is vented into the container without bubbling through the liquid.

The inlet 112 is provided in a perimeter portion of body 110. The inlet 112 is fluidly connected to the tube portion 130 via a conduit 129 within the body 110. In this way, the conduit 129 opens into the tube portion 130. In the example shown, the conduit 129 extends from the perimeter portion to the hub portion. The conduit extends from the inlet 112 to an inner surface of the tube portion 130. The inner surface is provided proximal the second opening 134.

The tube portion 130 extends through the body 110. That is, the tube portion 130 extends from a first surface of the body 110 to a second surface of the body 110. The first surface of the body 110 is opposingly arranged to the second surface of the body 110.

The tube portion 130 of the venting member 100 extends away from the body 110 so as to provide a first opening 132 distal to the body 110. In this way, the first opening 132 is spaced from the body 110.

The tube portion 130 extends axially to the body 110. In the example shown, the body 110 is annular with a central axis extending perpendicular thereto. The tube portion 130 extends along the central axis of the body 110. In this way the first opening 232 and the second opening 234 are provided on the central axis.

In the example shown, the venting member 100 includes a cover 150 which is configured to selectively close the second opening 134. In this way, the cover 150 is operable to be moved from a first position, in which the second opening 134 is open, to a second position in which the second opening 134 is closed.

Typically, with the cover in the first position, the venting member 100 is in a configuration for cleaning and storage by the user. Typically, with the cover in the second position, the venting member 100 is in a configuration for use, that is for venting air into an infant feeding bottle assembly.

Figure 2:
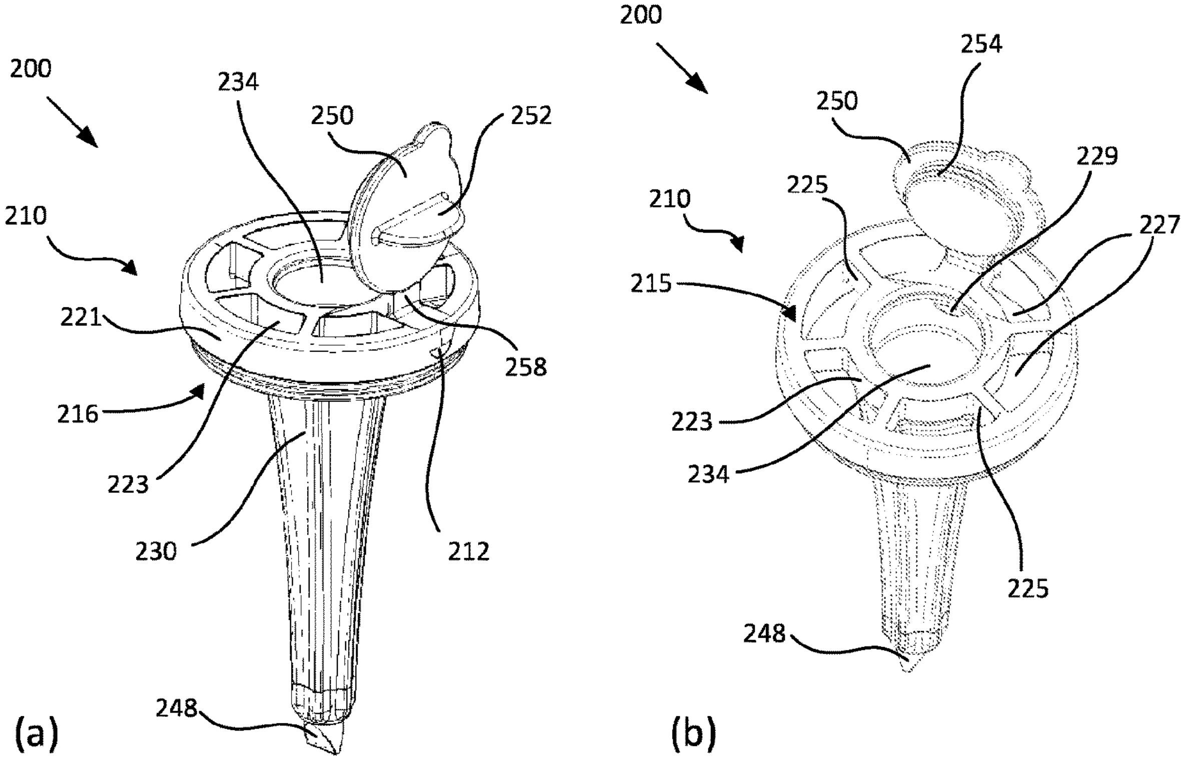
FIG. 2 shows (a) a perspective view and (b) and upper perspective view of another example venting member in a first configuration.

Referring now to FIGS. 2(*a*) and 2(*b*), there is a shown a further example venting member 200. Where the features are the same as the previous example, the reference numbers are also kept the same, but with a "2" as the initial digit. Thus, the venting member 200 includes a first member portion and a second member portion.

The first member portion includes a body 210 for mounting the venting member 200 to a container of an infant feeding bottle assembly. The body 210 includes an inlet 212 configured to vent air into the venting member 200. A tube portion 230, having a first opening 232 and a second opening 234, extends through the body 210 and is fluidly connected to the inlet 212.

The body 210 is annular. The body 210 includes a perimeter portion 221 and a hub portion 223. The perimeter portion 221 extends around the hub portion 223. In this way, the body 210 is an annular body 210 with the perimeter portion 221 forming an outer circumference and the hub portion 223 arranged axially to the perimeter portion 221.

The body 210 includes a plurality of radial members 225 extending between the hub portion 223 and the perimeter portion 221. The radial members 225 space the hub portion 223 from the perimeter portion 221.

A plurality of channels 227 is provided through the body 210. Each channel 227 is arranged between adjacent radial members 225. Each channel 227 extends axially through the body 210 and is adapted to allow liquid to flow therethrough, as is explained in further detail with reference to FIG. 4.

The inlet 212 is provided in perimeter portion 221. The inlet 212 is fluidly connected to the tube portion 230 via a conduit 229 through one of the radial members 225. In this way, the conduit 229 opens into the tube portion 230. In the example shown, the conduit 229 extends from the perimeter portion 221 to the hub portion 223. The conduit extends from the inlet 212 to an inner surface of the tube portion 230. The inner surface is provided proximal the second opening 234.

The tube portion 230 extends through the hub portion 223 of the body 210. That is, the tube portion 230 extends from a first surface 215 of the body 210 to a second surface 216 of the body 210. The first surface 215 of the body 210 is opposingly arranged to the second surface 216 of the body 210.

In the example shown in the FIGS. 2(*a*) and 2(*b*) the first surface 215 is a first surface of the hub portion 223 and the second surface 216 is a second, opposing surface of the hub portion 223. Thus, the first surface 215 includes the second opening 234. The tube portion 230 extends from the second surface 216 of the body 210.

The tube portion 230 of the venting member 200 extends away from the body 210 so as to provide a first opening 232 distal to the body 210. In this way, the first opening is spaced from the body 201.

The tube portion 230 extends axially to the body 210. In particular, the body 210 is annular with a central axis extending perpendicular thereto. In particular, the tube portion 230 extends along the central axis of the body 210. In this way the first opening 232 and the second opening 234 are provided on the central axis.

The second member portion is a cover 250. The cover 250 is connected to the first member portion and is configured to selectively close the second opening 234 when mounted to the first member portion. The cover 250 is provided on the venting member 200. The cover 250 is integrally formed with the venting member 200.

The cover 250 is connected to the body 210 by a hinge 258. In this way, the body 210, the cover 250 and the hinge 258 are integrally formed. Stated differently, the body 210, the cover 250 and the hinge 258 form a unitary part.

The hinge 258 is resiliently deformable so as to provide movement of the first member portion relative to the second member portion. That is, the hinge provides movement of the body 210 relative to the cover 250. The hinge 258 thereby allows the cover 250 to move between the first and second positions while attached to, or formed with, the body 210 of the first member portion.

The cover 250 includes a handle 252. The handle 252 extends from the cover 250 so as to enable the user to grip the cover 250 when moving the cover 250 between the first and second positions, in particular to enable the user to pull the cover 250 out of the second opening 234.

As shown in FIGS. 2(*a*) and 2(*b*), the venting member 200 is shown with the cover 250 in a first position. In the first position the second opening 234 is open.

Figure 3:
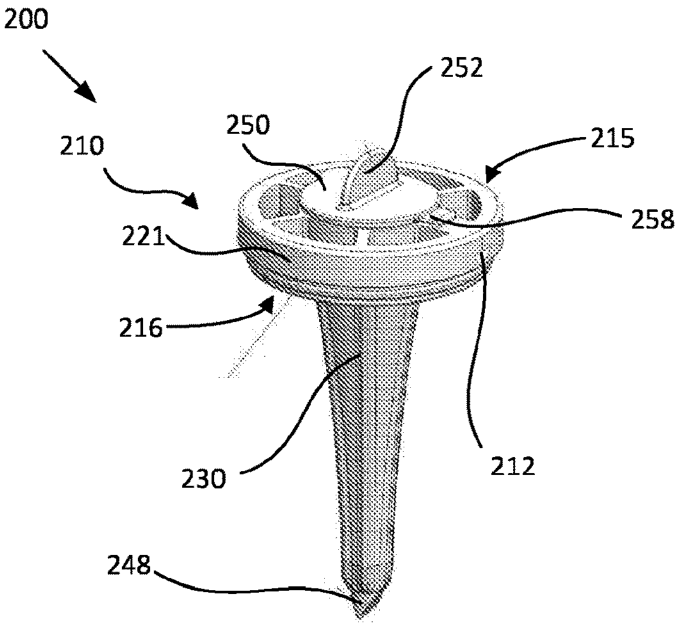
FIG. 3 shows a perspective view of the venting member of FIG. 2 in a second configuration.

A sealing means is provided on the venting member 200. The sealing means is configured to provide a sealing engagement between second member portion and the second opening 234 of the first member portion when the second opening is selectively closed. In this way, the sealing means provides a sealing engagement between the cover 250 and the second opening 234 when the cover 250 closes the second opening 234. The sealing means is configured to provide a sealing engagement between the cover 250 and second opening 234 when the cover 250 is in the second position, such as shown in FIG. 3. The sealing means is configured to provide a sealing engagement between the second member portion and the first member portion when the cover 250 is in the second position. In each configuration, the sealing means provides an air-tight seal of the second opening 234 when the second opening 234 is selectively closed. Consequently, any air venting into the venting member 200 is directed into the tube portion 230 and cannot pass through the second opening 234.

In the example shown, the sealing means is provided as a projecting lip 254 depending from the underside of the cover 250 and forming an interference fit with the second opening 234. In alternative examples, the sealing means may include a resiliently deformable portion provided on one of, or both of, the first member portion and the second member portion.

The tube portion 230 is tapered. The tube portion 230 narrows as it extends from the body 210. The tube portion 230 narrows towards the first opening 232.

The cross-sectional area of the tube portion 230 at the second opening 234 is greater than a cross-sectional area of the tube portion 230 at the first opening 232. In this way, the volume encompassed by the tube portion 230 is wider at the second opening 234 than at the first opening 232. The encompassed volume narrows from the second opening 234 to the first opening 232.

The tube portion 230 is integrally formed with body 210. The tube portion 230 is formed with the body 210 as a unitary part. That is, the tube portion 230 is formed with the body 210 by a single moulding process, as described in further detail below. By forming the body and tube portion as a unitary part, the tube portion is mounted to the body as a single part.

The tube portion 230 of the venting member includes a one-way valve 248 mounted to the first opening 232. The one-way valve 248 is mounted to the first opening 232 to enable it, in use, to control venting of air from the venting member 200 into the container. In this way, as an infant feeds from the infant feeding bottle assembly, the one-way valve 248 responds to a negative internal pressure generated within the container. The negative internal pressure causes a pressure differential across the one-way valve 248 which opens the valve, venting air into the container to alleviate the negative internal pressure.

In the example shown, the one-way valve 248 is a duckbill valve. The duckbill valve includes a slit through the apex of a ridge between two angled walls. In use, in response to negative internal pressure the angled walls distort, thereby opening the slit and venting air into the container of the infant feeding bottle assembly.

Any suitable one-way valve may be mounted to the first opening by appropriate means to control venting of air into an infant feeding bottle assembly. Thus, a one-way valve may be permanently or removably mounted to the first opening so as to be able to control venting of air into the container. Non-limiting examples of a one-way valve are described herein with reference to FIGS. 5 and 6.

The one-way valve 248 in the example shown in FIGS. 2(*a*) and 2(*b*) is integrally formed with the tube member. Particularly, the one-way valve 248 is integrally mounted to the first opening 232 of the tube portion 230.

As will be apparent, in further examples, the inlet and any conduit fluidly connected with the inlet may be provided in any suitable configuration so as to vent air into the venting member. Optionally, a plurality of inlets may be provided in the first member portion. Each inlet of a plurality of inlets may be fluidly connected to the tube portion via a respective conduit. Two or more inlets may be fluidly connected to the tube portion via a common conduit.

In further examples the tube portion may extend through the body, as well as optionally extend away from the body, in any suitable direction to vent air into the container of the infant feeding bottle assembly. Thus, for example, the tube portion may extend through or away from any part of the body, including a hub portion, a perimeter portion or otherwise. The tube portion may extend through or away along an axis in parallel to, or at an angle to, a central axis of the body. The tube portion may extend in a linear, curved, helical or irregular path.

In further examples one or both of the first opening and second opening may be provided in any suitable location on the venting member. That is, the first opening may be provided in any location on the venting member to vent air, in use, into a suitable part of the infant feeding bottle assembly into which it is mounted. Additionally, or alternatively, the second opening may be provided in any location on the venting member so as to enable easy cleaning of the venting member or to simplify manufacture.

The venting member 200 is formed using an injection moulding process. The injection moulding process forms the first member portion with the second member portion. The moulding process forms the body 210 with the inlet 212 configured to vent air into the venting member 200. The injection moulding process also forms the tube portion 230 having the first opening 232 and second opening 234. In the example shown in FIG. 2, the tube portion 230 is formed extending through the venting member and fluidly connected to the inlet 212.

The injection moulding process for forming the example shown in FIG. 2 includes a first moulding step and a second moulding step. The first moulding step forms the first member portion and the second member portion. The first moulding step forms the tube portion 230, the cover 250 and the body 210. The tube portion 230 and the cover 250 are each integrally formed with the body 210 in the first moulding step.

The first moulding step uses a first polymer, in this case an elastomer. Thus, the cover 250, the body 210 and the tube portion 230 are formed from the first polymer, in this case, a silicone rubber with a hardness of Shore A 70.

The second moulding step forms the one-way valve 248. The second moulding step integrally forms the one-way valve 248 with the tube portion 230. The second moulding step integrally mounts the one-way valve 248 to the first opening 232.

The second moulding step uses a second polymer, in this case a further elastomer. The second polymer is co-moulded to the first elastomer. The one-way valve 248 is formed of a silicone rubber with a hardness of Shore A 40. In this way, the one-way valve 248 is provided co-moulded to the venting member 200. Optionally, the second moulding step may also form a sealing means on one or both of the body or the cover.

Although the example shown in FIG. 2 is formed using both first and second moulding steps, the second moulding step may be optional so that other venting members within the scope of the invention may be formed using the first moulding step alone. For example, venting members which do not require a one-way valve may be formed using only the first moulding step.

Further optionally, a venting member may be formed using a method including a second moulding step which forms a feature other than, or in addition to, a one-way valve. The second moulding step therefore may form a component, or part thereof, of the first or second member portion, so as to provide a component, or part thereof, in a different material from the parts formed in a first moulding step. For example, the sealing means may include an elastomer, or other material to make the sealing engagement more reliable.

Referring now to FIG. 3, there is shown the venting member 200 of FIGS. 2(*a*) and 2(*b*) with the second opening 234 closed. That is, the cover 250 is shown in the second position so as to provide a sealing engagement between the cover 250 and the second opening 234.

In the second position, the second opening 234 is selectively closed. The sealing engagement of the cover 250 in the second opening 234 forms a fluid-tight seal of the second opening 234. In this way air venting into the venting assembly 200 from the inlet 212 is directed or conveyed from the inlet to the tube portion 230.

The second opening 234 may be selectively opened by a user pulling the handle 252 of the cover 250 away from the body 210, thereby releasing the sealing engagement.

Figure 4:
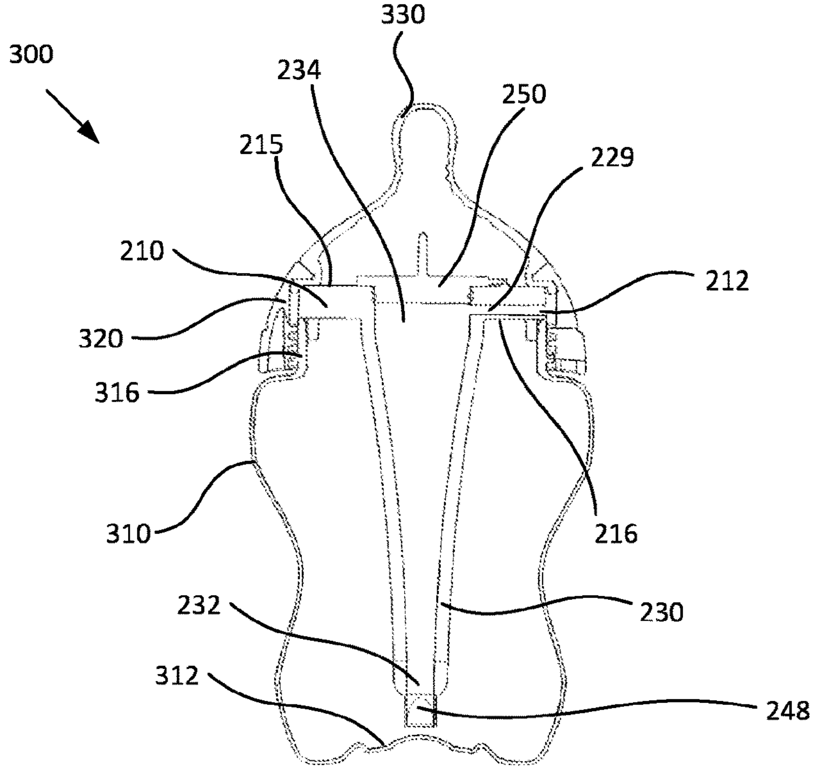
FIG. 4 shows a cross-sectional view of the venting member of FIGS. 2 and 3 in the second configuration and mounted in an infant feeding bottle assembly.

Referring now to FIG. 4, there is shown the venting member 200 of FIGS. 2 and 3 wherein the cover 250 is in the second position and the venting member 200 is mounted for use in an infant feeding bottle assembly 300. In this way, the venting member 200 is shown with the second opening 234 of the first member portion closed by the second member portion. In particular, the cover 250 is sealingly engaged in the second opening 234.

The infant feeding bottle assembly 300 includes a container 310 with a base 312 and a mouth defined by a neck 316. The venting member 200 is mounted to the container 310 to sit at least partially within the mouth of the container 310. A screw ring 320 with a nipple 330 is mounted to the neck of the container 310 using opposingly arranged screw threads on the neck 316 and screw ring 320, as is commonly known. The venting member 200 is thus retained within the infant feeding bottle assembly 300 by the screw ring 320.

As described herein, the body 210 includes a plurality of channels 227 arranged to provide openings through the body 210. Each channel 227 thereby provides a fluid pathway from the first surface 215 of the body 210 to the second surface 216 of the body 210. Thus, with venting member 200 mounted in the infant feeding bottle assembly 300, each channel 227 ensures a fluid flow path between the container 310 and the nipple 330.

The venting member 200 is mounted to the container 310 so that the first surface 215 is disposed towards the nipple 330 of the infant feeding bottle assembly 300 and so that the second surface 216 is disposed towards the container 310. In this way, the tube portion 230 extends distally from the body 210 so that the first opening 232 is disposed proximal to the base 312 of the container 310. The tube portion 230 extends distally from the body 210 so that the one-way valve 248 is disposed proximal to the base 312 of the container 310.

The venting member 200 is mounted to the container 310 so that the inlet 212 is in fluid communication with the ambient atmosphere. The venting member 200 is mounted so that the perimeter portion 221 including the inlet 212 is positioned external to, that is above, the neck of the container 310. The venting member 200 is mounted for use in the infant feeding bottle assembly 300 with the inlet 212 positioned outside the container 310. Consequently, the inlet 212 is in fluid communication with the ambient atmosphere via the residual space between the respective screw threads of the screw ring 320 and container 310.

To drink from the infant feeding bottle assembly 300, the nipple 330 is placed in the infant's mouth. The infant is typically upright, or at least partially reclined to feed, therefore the infant feeding bottle assembly 300 is inclined with the nipple 330 angled downwards. Liquid from the container 310 thus flows to the nipple 330 through the channels 227 of the body 210.

As the infant sucks on the nipple 330 to drink the liquid from the container 310, a negative internal pressure is generated within the infant feeding bottle assembly 300. The one-way valve 248 thus opens in response to the pressure differential across it, venting air into the container 310 and alleviating the negative internal pressure.

By providing the first opening 232 proximal to the base 312 of the container 310, when the infant feeding bottle assembly 300 is inclined with the nipple in the infant's mouth, the one-way valve 248 may be located above the liquid when venting air. In this way, air vented into the container 310 is conveyed above the fluid instead of bubbling within the fluid.

In other examples, in use, the inlet may be arranged in fluid communication with the ambient atmosphere by any suitable means. For example, a channel or series of channels may be provided in one or more surfaces in the body or neck of the container to provide a conduit to the ambient atmosphere when the venting member is mounted for use.

Figure 7:
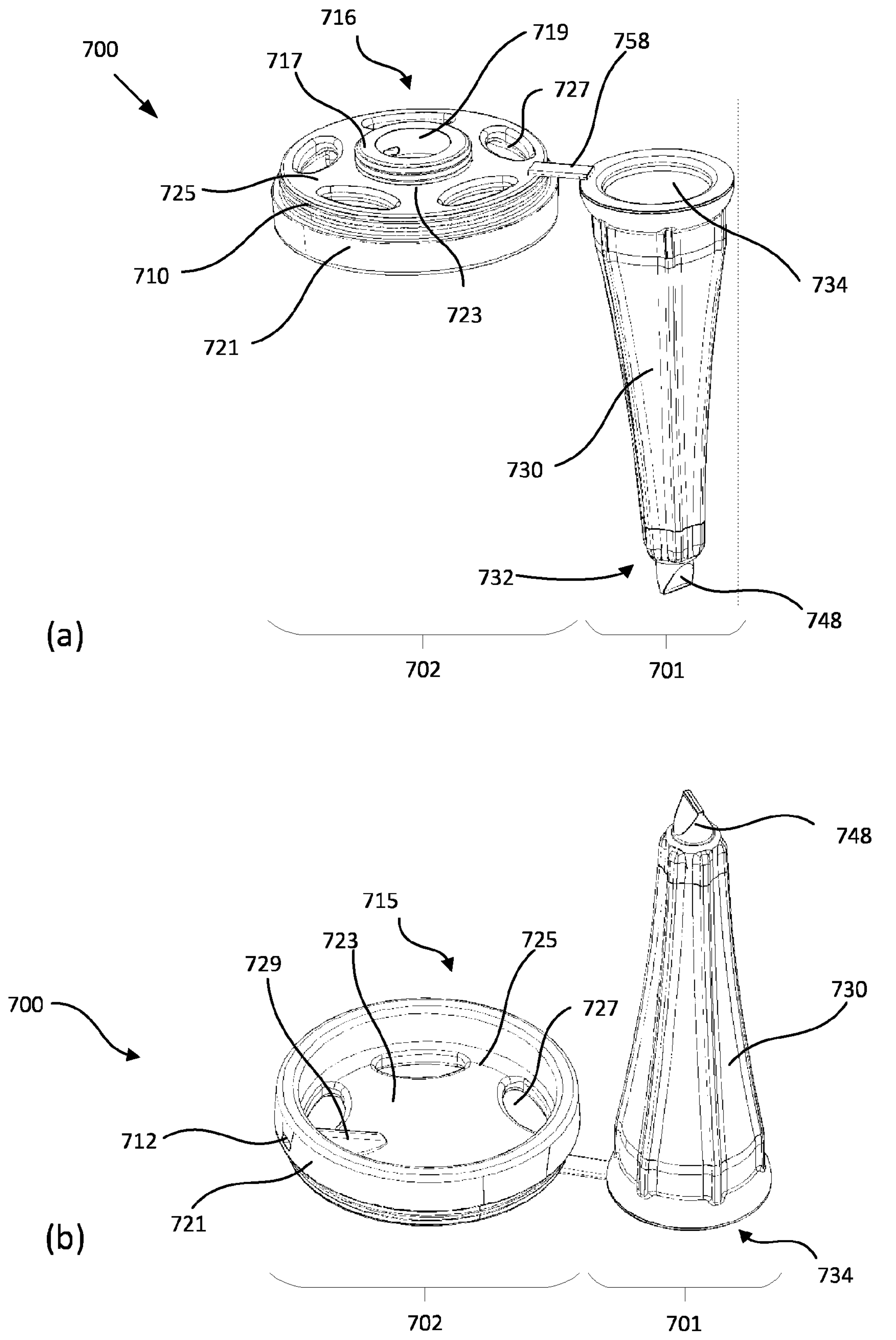
FIG. 7 shows (a) perspective view from above and (b) a perspective view from underneath of a further example venting member in a first configuration.
Figure 8:
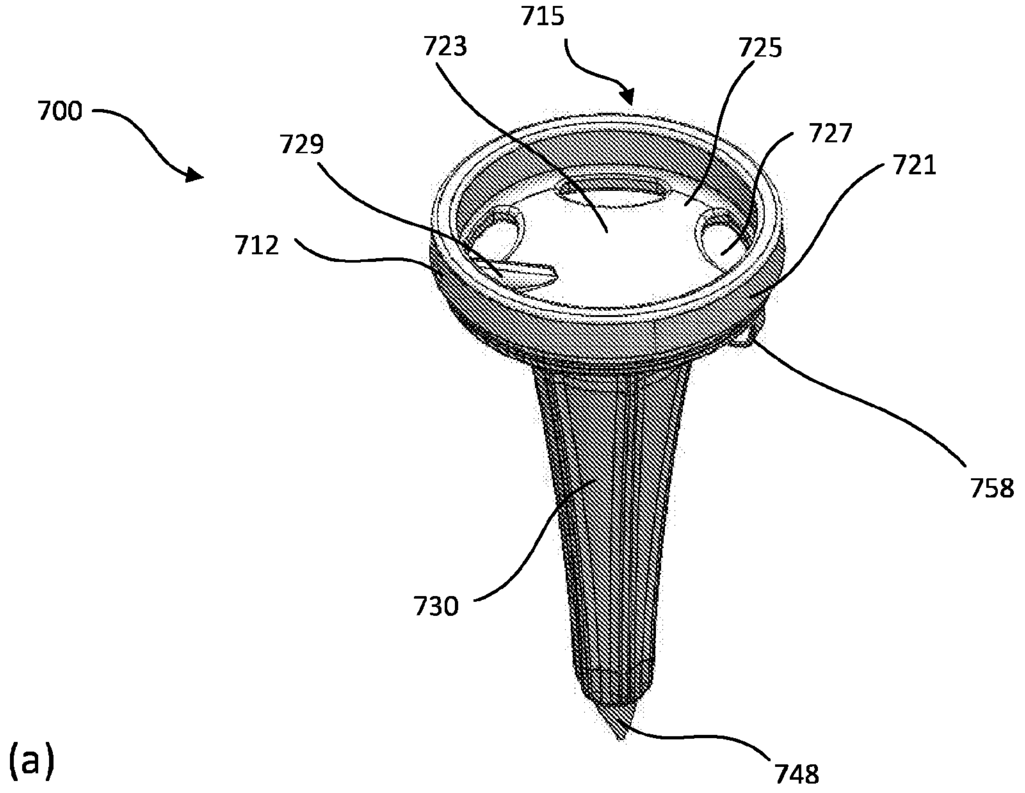
FIG. 8 shows (a) a perspective view from above and (b) a perspective view from underneath of the venting member of FIG. 7 in a second configuration.
Figure 8:
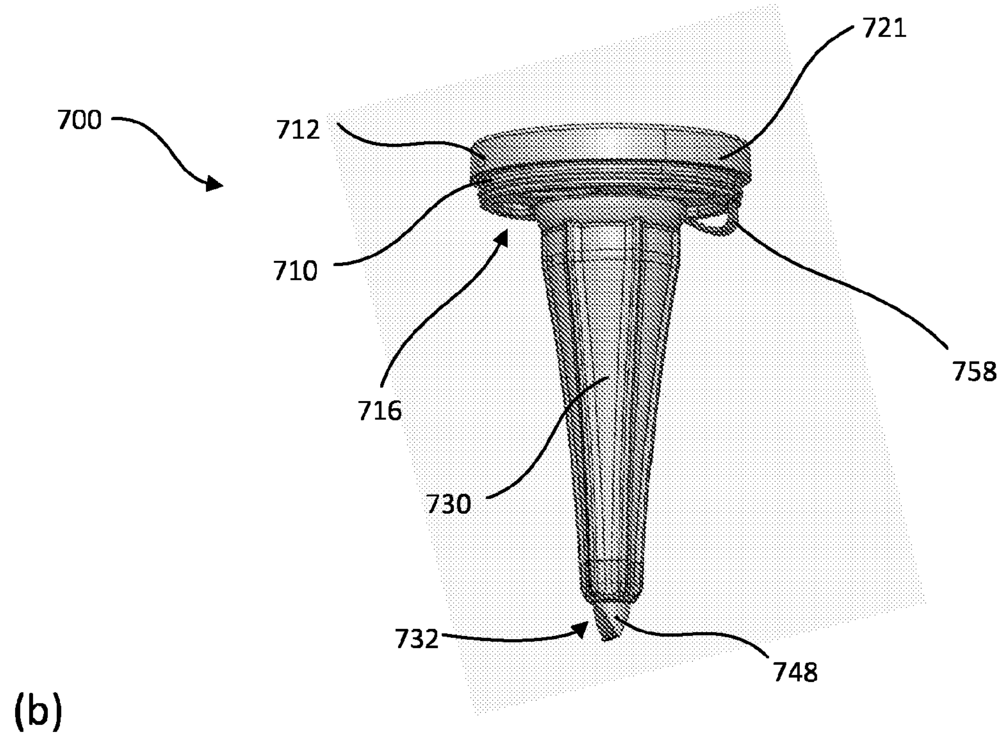

Referring now to FIGS. 7 and 8, there is shown a further example venting member 700. Where the features are the same as a previous example, the reference numbers are also the same, but with a "7" as the initial digit. Thus, the venting member 700 includes a first member portion 701, having a tube portion 730 with a first opening 732, and a second opening 734. The venting member includes a second member portion 702 connected to, and configured to be mountable on, the first member portion 701 so that the second opening 734 is selectively closed by the second member portion 702.

The venting member 700 also includes an inlet 712 for venting air into the venting member 700, wherein the venting member 700 is configured so that the inlet 712 is fluidly connected to the first opening 732 when the second member portion 702 is mounted on the first member portion 701.

The venting member 700 is configured to be mounted, in use, to a container of an infant feeding bottle assembly, so that the first opening 732 is disposed within the container.

In the example shown, the second member portion 702 includes a body 710 configured to mount the venting member 700, in use, to a container of an infant feeding bottle assembly. The body 710 is configured to be mounted to the mouth of a container. The body 710 is annular and is sized to be mounted to the mouth so that the body 710 sits outside the container. The body may be adapted to be mounted to the mouth of other containers of infant feeding bottle assemblies.

The body 710 is annular with a central axis extending perpendicular thereto.

The body 710 includes a perimeter portion 721 and a hub portion 723. The perimeter portion 721 extends around the hub portion 723. In this way, the body 710 is an annular body with the perimeter portion 721 forming an outer circumference and the hub portion 723 arranged axially to the perimeter portion 721.

The body 710 includes a plurality of radial members 725 extending between the hub portion 723 and the perimeter portion 721. The hub portion 723 is spaced from the perimeter portion 721 by the radial members 725.

A plurality of channels 727 is provided through the body 710. Each channel 727 is arranged between adjacent radial members 725. Each channel 727 extends axially through the body 710, thereby allowing liquid to flow through in the same manner as is explained with reference to FIG. 4.

Each channel 727 extends from a first surface 715 of the body 710 to a second surface 716 of the body 710. The first surface 715 of the body 710 is opposingly arranged to the second surface 716 of the body 710.

The first surface 715 of the body 710 is a recessed surface. That is, the perimeter portion 721 has greater axial height than the hub portion 723 and the intermediate radial members 725. The hub portion 723 and radial members 725 are axially offset to a lower edge of the perimeter portion 721. In this way, when the venting member 700 is mounted in an infant feeding bottle assembly, the nipple volume is maximised, thereby increasing the space between the body 710 and nipple which is available to hold liquid as the infant feeds from the inverted infant feeding bottle assembly. Advantageously, the recessed surface ensures that the venting member 700 will not impede the nipple or a feature of the nipple, such as a nipple flange or a nipple one-way valve. Thus, a smoother flow of liquid may be achieved from the nipple to the feeding infant.

The first member portion 701 includes a tube portion 730 with a first opening 732 and a second opening 734. The tube portion 730 of the venting member includes a one-way valve 748 mounted to the first opening 732. The one-way valve 748 is mounted to the first opening 732 to enable it, in use, to control venting of air from the venting member 700 into the container. In this way, the one-way valve 748 controls venting of air from the atmosphere in the container.

In the example shown, the one-way valve 748 is a duckbill valve, as described herein with reference to FIG. 2. However, in the alternative, any suitable one-way valve may be used, such as any of the one-way valves described herein.

The second opening 734 is adapted to receive the second member portion 702 so as to be selectively closed by the second member portion 702. In this way, the second member portion 702 is operable to be moved from a first position, in which the second opening 734 is open, to a second position in which the second opening 734 is closed. The venting member 700 is shown in the first position in FIG. 7 and in the second position in FIG. 8.

Typically, in the first position, the venting member 700 is in a configuration for cleaning and storage by the user. Typically, in the second position, the venting member 700 is in a configuration for use, that is for venting air into an infant feeding bottle assembly.

As shown in FIG. 8, the first member portion 701 is configured so that, in the second position, that is when mounted to the second member portion 702, the tube portion 730 extends away from the body 710. In this way, the first opening 732 is arranged distal to the body 710. The first opening 732 is spaced from the body 710.

Further, when in the second position, the tube portion 730 extends along the central axis of the body 710. In this way the first opening 732 and the second opening 734 are provided on the central axis.

The body 710 further includes an annular projection 717. The annular projection 717 is configured to mount the second member portion 702 on the first member portion 701, so as to selectively close the second opening 734. The annular projection 717 includes sealing means to provide sealing engagement between the second member portion 702 and the second opening 734. In this way, the sealing means provides a sealing engagement between the second member portion 702 and the second opening 734 when the second member portion 702 closes the second opening 734.

A cavity 719 extends into the body 710 of the second member portion 702. The cavity 719 extends axially into the body 710. The cavity 719 extends into the body from an opening in the second surface 716 of the body 710.

The inlet 712 is provided in the perimeter portion 721. The cavity 719 is fluidly connected to the inlet via a conduit 729 which extends away from the cavity 719. In this way, when the second member portion 702 is mounted onto the first member portion 701, that is, the venting member is in the second position, the inlet 712 is fluidly connected to the tube portion 730.

When the second member portion 702 is mounted onto the first member portion 701, that is, the venting member is in the second position, the conduit 729 extends away from the first opening 732 of the tube portion 730 at angle with respect to the central axis. In the example shown, the conduit 729 extends away from the first opening of the tube portion at an angle of 110°.

The first member portion 701 is connected to the second member portion 702 by a hinge 758. In this way, the first member portion 701, the second member portion 702 and the hinge 758 are integrally formed. Stated differently, the first member portion 701, the second member portion 702 and the hinge 758 form a unitary part.

The hinge 758 is resiliently deformable so as to provide movement of the first member portion 701 relative to the second member portion 702. That is, the hinge provides movement of the body 710 relative to the tube portion 730. The hinge 758 thereby allows the second member portion 702 to move between the first and second positions while connected to the first member portion 701.

The body 710 is configured to mount the venting member 700 to a container in substantially the same way as the example shown in the assembly 300 of FIG. 4.

The venting member 700 is formed using an injection moulding process substantially as described in reference to the venting member 200 shown in FIG. 2. Thus, the first member portion 701 and the second member portion 702 are formed in a first moulding step. The first moulding step uses a first polymer, in this case an elastomer. Thus, the body 710 and the tube portion 730 are formed from the first polymer, in this case, a silicone rubber with a hardness of Shore A 70.

The second moulding step forms the one-way valve 748. The second moulding step integrally forms the one-way valve 748 with the tube portion 230. The second moulding step integrally mounts the one-way valve 748 to the first opening 732.

The second moulding step uses a second polymer, in this case a further elastomer. The second polymer is co-moulded to the first elastomer. The one-way valve 748 is formed of a silicone rubber with a hardness of Shore A 40.

As with the method described in reference to the venting member 200 shown in FIG. 2, the method of forming the present venting member 700 may be adapted to form other venting members with corresponding first and second member portions. Thus, the second moulding step may be optional so that a venting member is formed using the first moulding step alone.

Further optionally, a venting member may include a second moulding step to form a feature other than, or in addition to, a one-way valve.

In further examples of the apparatus described with reference to FIGS. 7 and 8, the conduit may extend away from the first opening of the tube portion at a different angle with respect to the central axis. Thus, the conduit may extend at an angle of from greater than 90° to 150°, or an angle of from 100° to 150°, or an angle of from 110° to 150°. Preferably, the conduit extends away from the first opening of the tube portion at angle in the range of from 110° to 135° with respect to the central axis.

Features and modifications described with reference to other examples disclosed herein can also be used with example of FIGS. 7 and 8. So, for example, the inlet 712 vents air into the venting member when body is mounted to a container of an infant feeding bottle assembly in the same way as the inlets 112, 212 of FIGS. 1 to 4.

Figure 5:
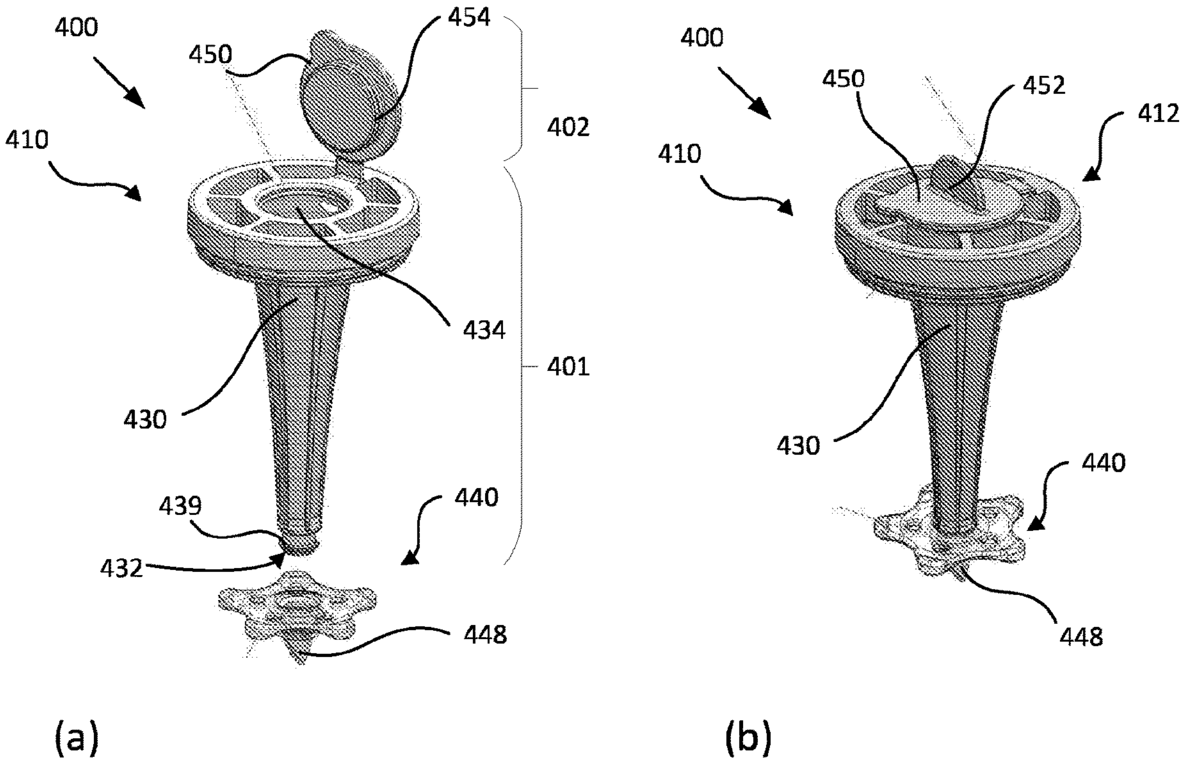
FIG. 5 shows perspective views of a portion of further example venting member in which another one-way valve is (a) demounted from and (b) mounted to a first opening.

Referring now to FIGS. 5(*a*) and 5(*b*) there is shown a further example venting member 400. Where the features are the same as the previous example, the reference numbers are also kept the same, but with a "4" as the initial digit.

The venting member 400 includes a first member portion 401 with a body 410 for mounting the venting member 400 to a container of an infant feeding bottle assembly. The body 410 includes an inlet 412 configured to vent air into the venting member 400. The first member portion 401 includes a tube portion 430, having a first opening 432 and a second opening 434, extends through the body 410 and is fluidly connected to the inlet 412.

The venting member 400 includes a valve member 440, mountable to the first opening 432. The valve member 440 includes one-way valve 448 formed thereon. The one-way valve 448 is a duckbill valve.

The valve member 440 is detachably mountable to the first opening 432. That is, the valve member 440 is formed separately from the venting member 400 and configured to be selectively mounted to the tube portion 430 for use. The valve member 440 is then demounted from the tube portion 430 by a user, for cleaning and storage.

The tube portion 430 includes a formation 439 to provide a sealing engagement of the valve member 440 to the first opening 432 as it is mounted thereto.

It should be noted, that although the tube portion 430 is formed separately from the valve member 440, the venting member 400 nevertheless benefits from a reduced number of parts as the tube portion 430, body 410 and cover 450 are integrally formed. Furthermore, easy cleaning is possible due to the easy access to the internal voids of the venting member 400 via the first opening 432 and second opening 434.

The valve member 440 is also suitable to be mounted to any venting member of the present invention such as, for example, the venting members described with reference to FIGS. 1 to 4, or FIGS. 7 and 8. When used with such venting members, the integrally formed one-way valve is not present. Instead, the respective tube portion may be configured with a formation to provide a sealing engagement of the valve member when mounted to the first opening.

The second member portion is a cover 450. The cover 450 is connected to the first member portion and is configured to selectively close the second opening 434 when mounted to the first member portion. The cover 450 is provided on the venting member 400. The cover 450 is integrally formed with the venting member 400.

The venting member 400 is formed using an injection moulding process such as the process described herein with reference to FIG. 2.

The venting member 400 is configured to adopt the second position, such as described with reference to FIG. 3, and used in an infant feeding bottle assembly such as that described with reference to FIG. 4.

Figure 6:
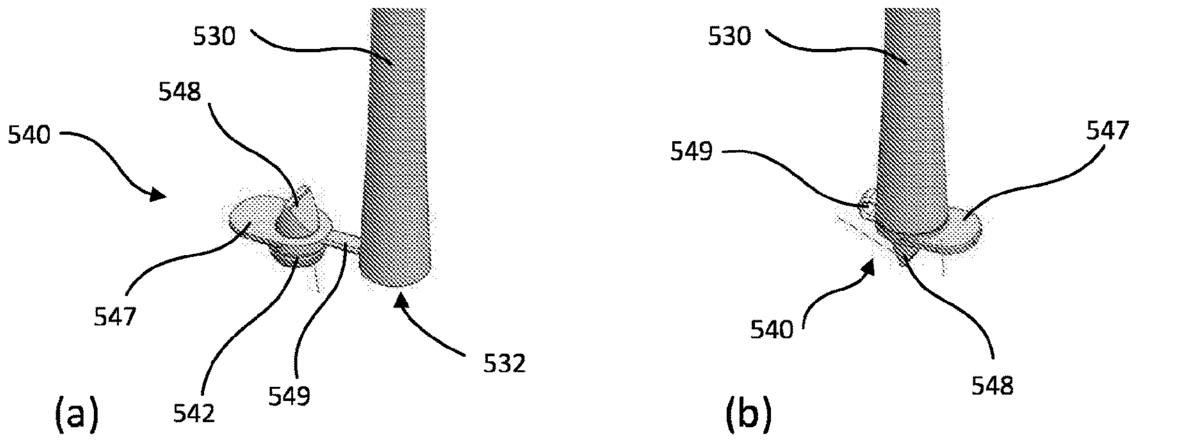
FIG. 6 shows perspective views of a section of another example venting member in which a further one-way valve is (a) demounted from and (b) mounted to a first opening.

Referring now to FIGS. 6(*a*) and 6(*b*) there is shown a section of a further example valve member 540. The valve member 540 is suitable to be mounted to any venting member of the present invention such as, for example, the venting members described with reference to FIGS. 1 to 5 or FIGS. 7 to 8.

The valve member 540 is mountable to the first opening 532 of a venting member. The valve member 540 includes one-way valve 548 formed thereon. The one-way valve 548 is a duckbill valve.

The valve member 540 is detachably mountable to the first opening 532. A handle 547 is provided to enable a user to mount the valve member 540 to, or demount the valve member 540 from, the first opening 532.

The valve member 540 is formed integrally with the tube portion 530. The valve member 540 includes a bridge portion 549 to connect the valve member 540 to the tube portion 530. Stated differently, the tube portion 530 and the valve member 540 form a unitary part.

The bridge portion 549 is resiliently deformable so as to provide movement of the valve member 540 relative to the tube portion 530. The bridge portion 549 enables the valve member 540 to move between a first valve position and a second valve position. The valve member 540 is moveable between a first valve position, in which the valve member 540 is mounted to the first opening 532 of the tube portion 530, and a second valve position, in which the valve member 540 is demounted from the first opening 532.

In both the first and second valve positions, the valve member 540 remains integrally formed with tube portion 530.

The valve member 540 includes a formation 542 to provide a sealing engagement of the valve member 540 as it is moved to the second position. The formation 542 provides a sealing engagement of the valve member 540 when mounted to the first opening 532.

It should be noted, that although the valve member 540 requires mounting to the first opening 532, the venting member including the valve member 540 is formed as a singled part. Assembly of the respective venting member is thereby simplified as the valve member 540 cannot be detached or lost from its venting member. Furthermore, easy cleaning is maintained due to the easy access to the internal voids of the venting member via the first opening 532 and second opening.

Figure 9:
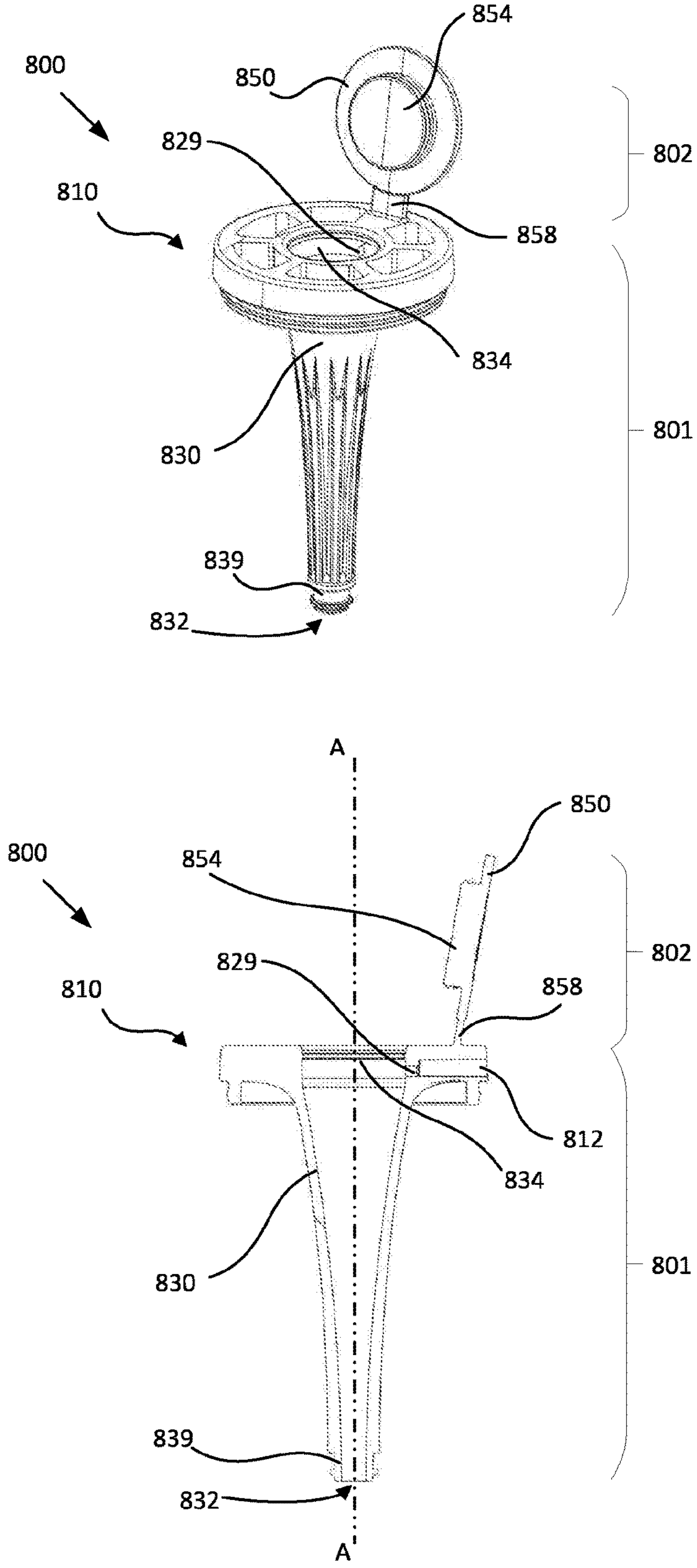
FIG. 9 shows a perspective view and (b) cross-sectional view of another example venting member.

Referring now to FIGS. 9(*a*) and 9(*b*) there is shown another example venting member 800. Where the features are the same as the previous example, the reference numbers are also kept the same, but with an "8" as the initial digit. The venting member 800 is similar to the venting member 400 described with reference to FIGS. 5(*a*) and 5(*b*) with a modified cover 850 and hinge 858.

The venting member 800 includes a first member portion 801 with a body 810 for mounting the venting member 800 to a container of an infant feeding bottle assembly. The body 810 includes an inlet 812 configured to vent air into the venting member 800. The first member portion 801 includes a tube portion 830, having a first opening 832 and a second opening 834, extends through the body 810 and is fluidly connected to the inlet 812.

The venting member 800 includes a valve member (not shown), mountable to the first opening 832. The valve member may be any suitable valve, for example: a detachably mountable valve member 440 such as those described with reference to FIGS. 5 and 6; or a valve member mounted to the first opening, such as those described with reference to FIGS. 1 to 4, 7 and 8.

It should be noted that, where the tube portion 830 is formed separately from the valve member 840, the venting member 800 nevertheless benefits from a reduced number of parts as the tube portion 830, body 810 and cover 850 are integrally formed. Furthermore, easy cleaning is possible due to the easy access to the internal voids of the venting member 800 via the first opening 832 and second opening 834.

The second member portion is a cover 850. The cover 850 is connected to the first member portion and is configured to selectively close the second opening 834 when mounted to the first member portion. The cover 850 is provided on the venting member 800. The cover 850 is integrally formed with the venting member 800.

The cover 850 is connected to the body 810 by a hinge 858. In this way, the body 810, the cover 850 and the hinge 858 are integrally formed. Stated differently, the body 810, the cover 850 and the hinge 858 form a unitary part.

The hinge 858 is resiliently deformable so as to provide movement of the first member portion relative to the second member portion. That is, the hinge provides movement of the body 810 relative to the cover 850. The hinge 858 thereby allows the cover 850 to move between a first, open position and a second, selectively closed position while attached to, or formed with, the body 810 of the first member portion.

The cover 850 is formed at an angle away from the central axis A, that is away from the vertical axis in use, of the venting member 800. Stated differently, in the first position, the cover 850 is disposed at angle to the central axis of the venting member 800. Thus, the cover 850 includes first cover portion adjoined to the hinge 858, and a second cover portion provided at an opposing edge of the cover 850. In the first position, the first cover portion is disposed radially inward, that is closer to the central axis A, of the second cover portion.

As with the example described at least with reference to FIGS. 2 and 5, the cover 850 includes a sealing means provided as a projecting lip 854 depending from the underside of the cover 850. Although as with the other examples, other suitable sealing means may be adopted. The projecting lip 854 forms an interference fit with the second opening 834 when the cover 850 is in the second position.

The venting member 800 is formed using an injection moulding process such as the process described herein with reference to the example of FIG. 2.

The venting member 800 is configured to selectively move between a first, open position and a second, closed position. The second position is substantially the same as that described with reference to the example of FIG. 3. The venting member 800 is thereby configured to be used in an infant feeding bottle assembly, in the same way as the venting member 200 described with reference to the example of FIG. 4.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A venting member for venting air into an infant feeding bottle assembly, the venting member comprising:
- a first member portion having a tube portion with a first opening and a second opening;
- a second member portion connected to, and configured to be mountable on, the first member portion so that the second opening of the first member portion is selectively closed by the second member portion; and
- an inlet for venting air into the venting member, wherein the venting member is configured so that the inlet is fluidly connected to the first opening of the first member portion when the second member portion is mounted on the first member portion;

wherein the venting member is configured to be mounted, in use, to a container of an infant feeding bottle assembly so that the first opening is disposed within the container; and wherein the first member portion and second member portion are integrally formed by injection moulding.

2. The venting member according to claim 1, wherein the first member portion comprises a body configured to mount the venting member, in use, to the container of an infant feeding bottle assembly; and wherein the tube portion extends through the body.

3. The venting member according to claim 2, wherein the second member portion is a cover configured to selectively close the second opening when mounted to the first member portion.

4. The venting member according to claim 2, wherein the body is annular, and the tube portion is configured to extend axially to the body.

5. The venting member according to claim 1, wherein the second member portion comprises a body configured to mount the venting member, in use, to the container of an infant feeding bottle assembly.

6. The venting member according to claim 5, wherein when the second member portion is mounted on the first member portion, the tube portion extends along a central axis of the body and is fluidly connected to the inlet by a conduit extending radially from the tube portion; and wherein the conduit extends away from the tube portion at angle in the range of from greater than 90° to 150° with respect to the central axis.

7. The venting member according to claim 1, wherein the tube portion comprises a one-way valve mounted to the first opening and configured to control venting of air into the container and, optionally, wherein the one-way valve is provided on a valve member configured to be selectively mounted to the first opening.

8. The venting member according to claim 7, wherein the one-way valve is integrally formed with the tube portion.

9. The venting member according to claim 1, wherein the tube portion is tapered.

10. The venting member according to claim 1, wherein the venting member comprises first and second opposing surfaces, and wherein the venting member is configured to be mounted, in use, to a container of an infant feeding bottle assembly so that the first surface is disposed towards the container and the second surface is disposed towards a nipple of an infant feeding bottle assembly.

11. The venting member of claim 1, wherein the venting member is configured to be mounted to a container of an infant feeding bottle assembly so as to vent air into the infant feeding bottle assembly.

12. A method of forming a venting member for venting air into an infant feeding bottle assembly, the method comprising:

forming a first member portion having a tube portion with a first opening and a second opening;

forming a second member portion connected to, and configured to be mountable on, the first member portion so that the second opening of the first member portion is selectively closed by the second member portion; and forming an inlet for venting air into the venting member, wherein the venting member is configured so that the inlet is fluidly connected to the first opening of the first member portion when the second member portion is mounted on the first member portion;

wherein the venting member is configured to be mounted, in use, to a container of an infant feeding bottle assembly so that the first opening is disposed within the container; and wherein the first member portion and second member portion are integrally formed by injection moulding.

* * * * *